(12) United States Patent
Aggarwal et al.

(10) Patent No.: US 6,275,508 B1
(45) Date of Patent: Aug. 14, 2001

(54) METHOD OF AND SYSTEM FOR PROCESSING DATAGRAM HEADERS FOR HIGH SPEED COMPUTER NETWORK INTERFACES AT LOW CLOCK SPEEDS, UTILIZING SCALABLE ALGORITHMS FOR PERFORMING SUCH NETWORK HEADER ADAPTATION (SAPNA)

(75) Inventors: Vijay Aggarwal, Marlborough, MA (US); Henry Charles Benz, Hollis, NH (US)

(73) Assignee: Nexabit Networks, LLC, Marlboro, MA (US)

(*) Notice: Subject to any disclaimer, the term of this patent is extended or adjusted under 35 U.S.C. 154(b) by 0 days.

(21) Appl. No.: 09/063,708

(22) Filed: Apr. 21, 1998

(51) Int. Cl.[7] .................................... H04J 3/06
(52) U.S. Cl. ............................ 370/503; 370/394
(58) Field of Search ...................... 370/503, 233, 370/234, 252, 253, 299, 300, 351, 352, 353, 354, 356, 358, 359, 360, 362, 364, 366, 391, 392, 394, 395, 399, 412, 413, 415, 428, 363, 365, 368, 378, 381

(56) References Cited

U.S. PATENT DOCUMENTS 5,465,331 * 11/1995 Yang et al. ...................... 709/244
5,566,170 * 10/1996 Bakke et al. ..................... 370/392
5,649,217 * 7/1997 Yamanaka et al. ................ 710/52
5,821,875 * 10/1998 Lee et al. ..................... 340/825.79
5,862,128 * 1/1999 Cooperman et al. ............. 370/236
5,862,136 * 1/1999 Irwin .............................. 370/395
5,982,783 * 11/1999 Frey et al. ........................ 370/467
6,032,190 * 2/2000 Bremer et al. ................... 709/238
6,034,954 * 3/2000 Takase et al. ..................... 370/362

\* cited by examiner

Primary Examiner—Dang Ton
Assistant Examiner—Phirin Sam
(74) Attorney, Agent, or Firm—Rines and Rines

(57) ABSTRACT

A technique and system for manipulating, converting or adapting datagram headers as required during traverse from one interface of a networking device to another, by novel clocked micro-sequencing and selection amongst input and output FIFO data streams, through dividing input serial data streams into small groups of FIFO input data streams and feeding the groups parallely into a matrix of a multilane highway of header unit input data, constant data pattern and computational unit busses controlled by such micro-sequencing so as to enable such processing of packet datagram headers and the like at very high wire speed, but using low clock speeds, and in a scalable manner.

32 Claims, 13 Drawing Sheets

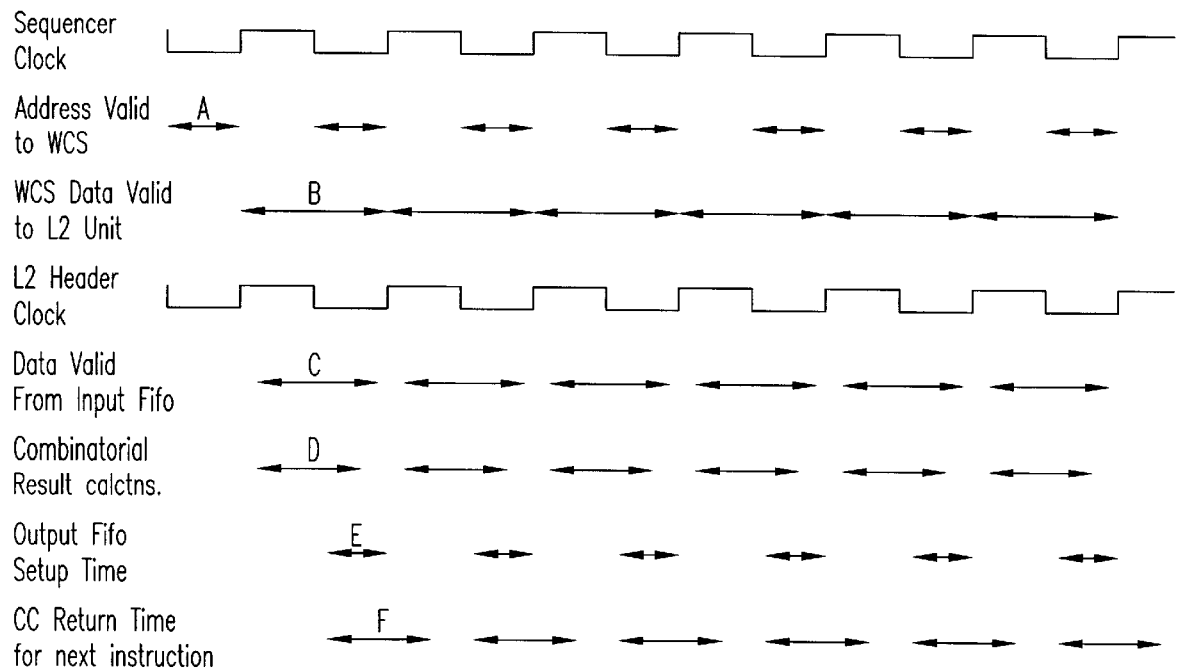

A— This is the time from rising edge of sequencer to address valid to the WCS memory.
B— This is the time from address valid to WCS to data valid out of the WCS after being latched, so we have a complete cycle worth of data valid to the L2 unit.
C— Rising edge of L2 header clock to data valid on the input Fifo busses.
D— From the data valid on the L2 header busses to the amount of time the combinatorial logic has to produce results.
E— This is the maximum setup time before the output Fifo starts to latch data for output.
F— This is the worst case CC return time after muxing it internally in the L2 header and then muxing the WCS address for the next instruction pointer.

FIG. 13

METHOD OF AND SYSTEM FOR PROCESSING DATAGRAM HEADERS FOR HIGH SPEED COMPUTER NETWORK INTERFACES AT LOW CLOCK SPEEDS, UTILIZING SCALABLE ALGORITHMS FOR PERFORMING SUCH NETWORK HEADER ADAPTATION (SAPNA)

The present invention relates to networking systems and the manipulation of datagram headers therein, being more particularly directed to the problems of adaptation of headers on datagrams that traverse across interfaces that have dissimilar native headers.

BACKGROUND OF INVENTION

In the computer networking industry, datagrams originate from application layers and traverse down to different layers of software on a host computer, finally entering the data link layer and then the physical layer. For each type of physical layer, there are multiple data link layer formats that can be attached to the datagram. The same datagram can traverse different physical layers with different datalink layer headers, but at each node where the datagram crosses such a boundary, the ingress datalink layer has to be stripped and a new data link layer, for the next network, has to be inserted.

At the advent of networking in the 1960's, wire speeds were of the order of 300 bits/Sec to 56 k bits/Sec. As data packets traverse at these speeds across different networking nodes, changing datagram headers from one native interface to a different native interference was not much of a load on the system; in fact, it was done mostly in processors. In todays networking, however, environment speeds are ever increasing, and the requirement to process datagram headers at high speed has become a bottleneck in effective usage of high speed physical network links.

Networking nodes examine datagrams from an interface in the language of that interface (data link and network link layer headers), and then determine the destination interface on the networking node. If the destination interface has a different language (data link layer and network layer headers), then a translation is required from the ingress language to the egress language. Such translation of headers, i.e. header manipulation or adaptation, is done many ways in traditional networking nodes, with the criteria chosen to do this translation being based on the speeds of the interface. If the speed of such interface is relatively lower than the processor instruction speed on the networking node, then the designers usually use the processors to effect the necessary translation. In recent years, however, with the advent of optical fiber transmission, the speeds are reaching astronomical numbers, anywhere from 100 Mbits/second ($10^8$ bits per second) to 10 Gbits/second ($10^{10}$ bits per second). At those rates, a packet header (usually 20 bytes) takes about 1.6 uSec (100 Mbits/Sec) to about 16 nSec (at 10 Gbits/Sec). At such rates, current processors running, for example, with the order of about 200 MHz clocks cannot keep up with very high data rates. This lack of performance by the processors has forced the optical physical layers to have substantial and undesirable dead time.

Designers of current networking nodes have accordingly started to try to accomplish this function of header translation or manipulation or change, in hardware without the use of processors. While the advent of ASIC has helped the cause tremendously, even ASICs only run clocks internally comparable to the byte stream, and thus still face challenges in processing the headers.

The invention herein relates to datagram header processing and hardware with the aid of novel procedures and algorithms that allow the conversion of datalink layers and network layer headers from one interface of a networking device to another interface at speeds that are scalable to extremely high speeds; i.e. scalable so that as the physical link speed increases, the technique allows for scaling to those high speeds. The invention accomplishes this processing of the datagram headers for high speed interfacing uses at relatively very low clock speeds, thereby leveraging the power to process headers at low speed to maintain data rates at high speed.

OBJECTS OF INVENTION

A principal object of the present invention, accordingly, is to provide a novel method of and system for processing datagram headers in high speed computer network interfacing, utilizing relatively low clock speeds and with the aid of scalable techniques and algorithms for performing such network header adaptation (SAPNA).

Other and further objects will be explained hereinafter and are more particularly delineated in the appended claims.

SUMMARY

In summary, however, the invention embraces a method of changing and manipulating datagram headers of packets of serial data streams as required during traverse from one interface of a networking device to another, that comprises, dividing input FIFO serial data streams into a plurality of smaller successive groups of bytes of data; forming a matrix of successive multi-lane highway busses for each of input data, data patterns, computational units, and constant bus lines; applying each of the successive groups of bytes of input data to a corresponding successive input data highway bus lane and in a parallel fashion; connecting computational bus lines of the matrix to output FIFOs corresponding respectively to the input FIFOs and through respective selectors; clock-sequencing the operation of the selectors in accordance with various predetermined logic sequences for switching in the matrix the selection of data fed through the selectors to their output FIFOs in desired combinations selected from the FIFO input data, the results of the computational units, and the data patterns, and thereby manipulating the original datagram header data stream as desired; and setting the clocking rate to a value low compared to the data stream rate.

Preferred and best mode configurations, software implementation and hardware will hereinafter be fully described.

DRAWINGS

The invention will now be described with reference to the accompanying drawings, FIG. 1 of which is a block and functional diagram of an overall design of a header/sequencer unit mastered by an HDLC controller on a data packet level basis;

FIG. 13 is a waveform and timing diagram illustrating the relative timing of the operation of the write control store and header units of FIG. 1;

Figure 1:
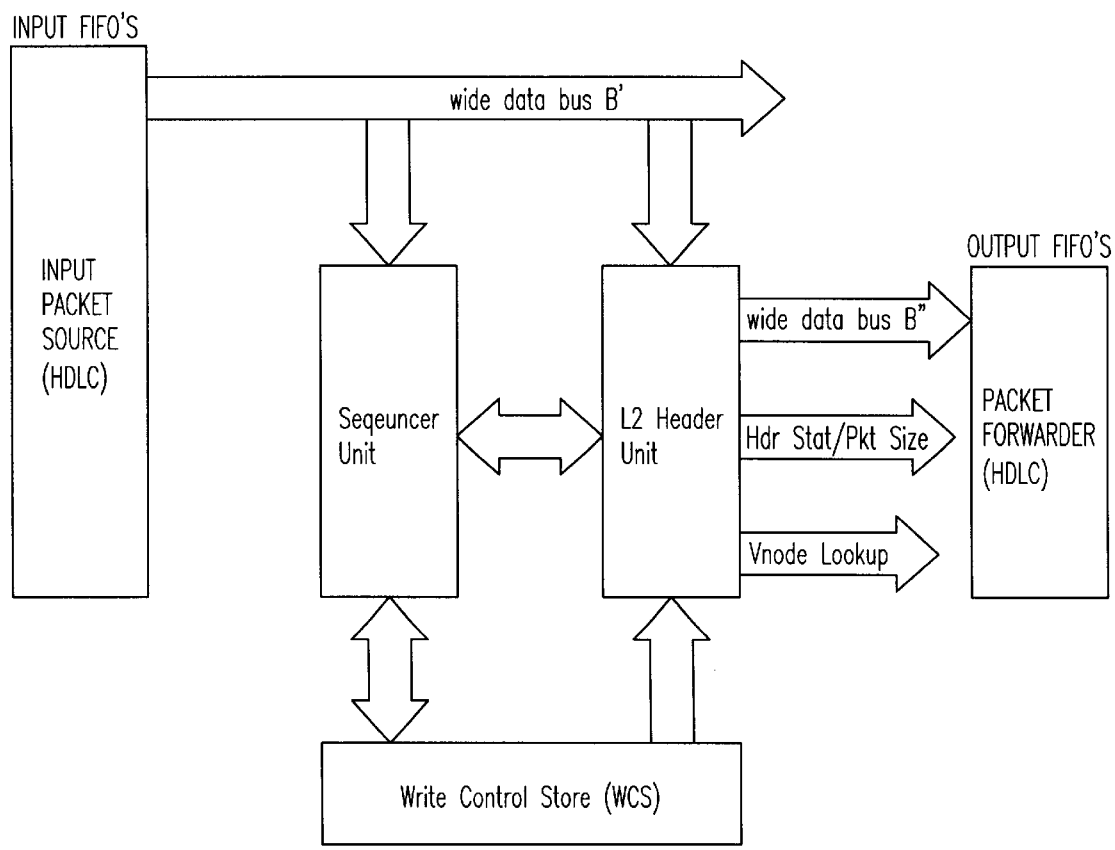
Figure 14:
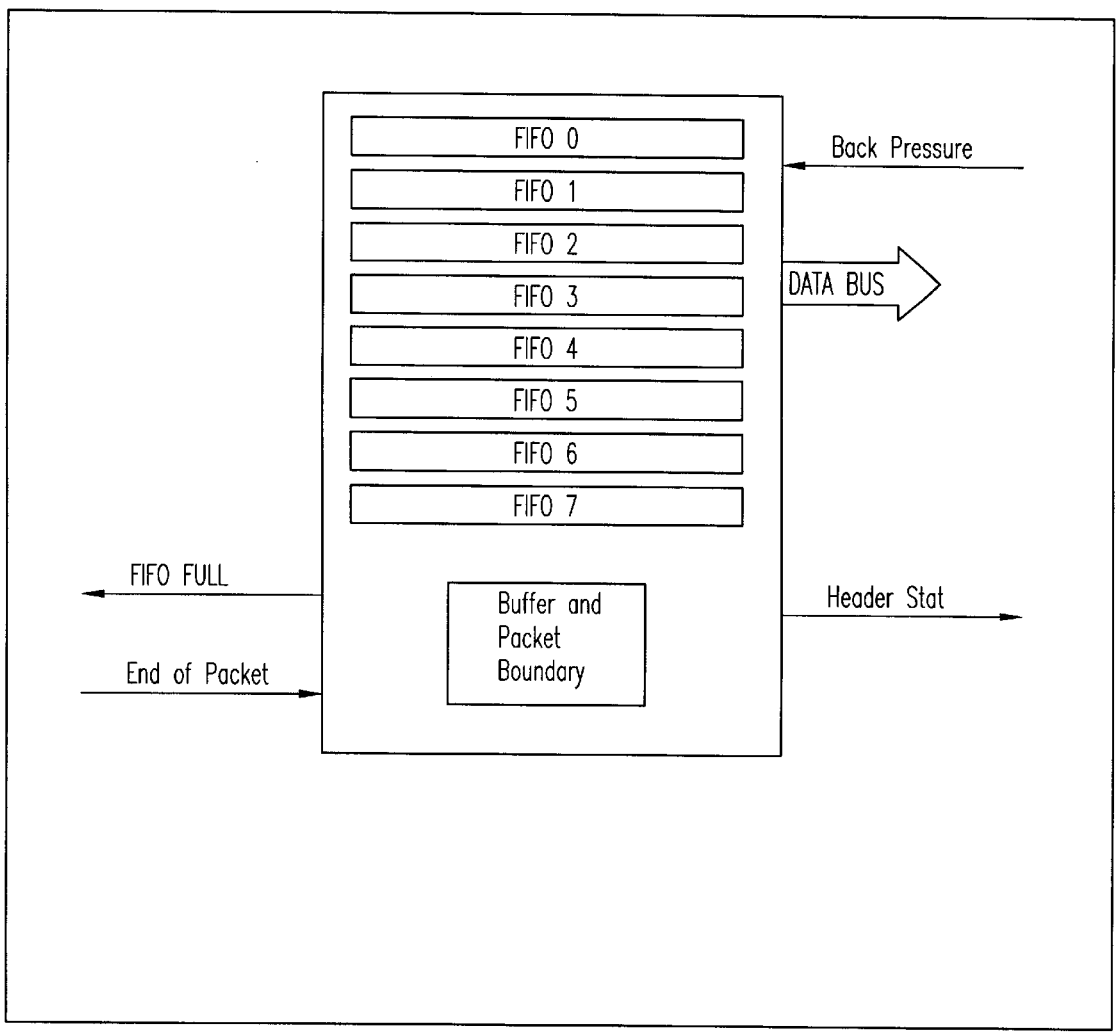
Figure 15:
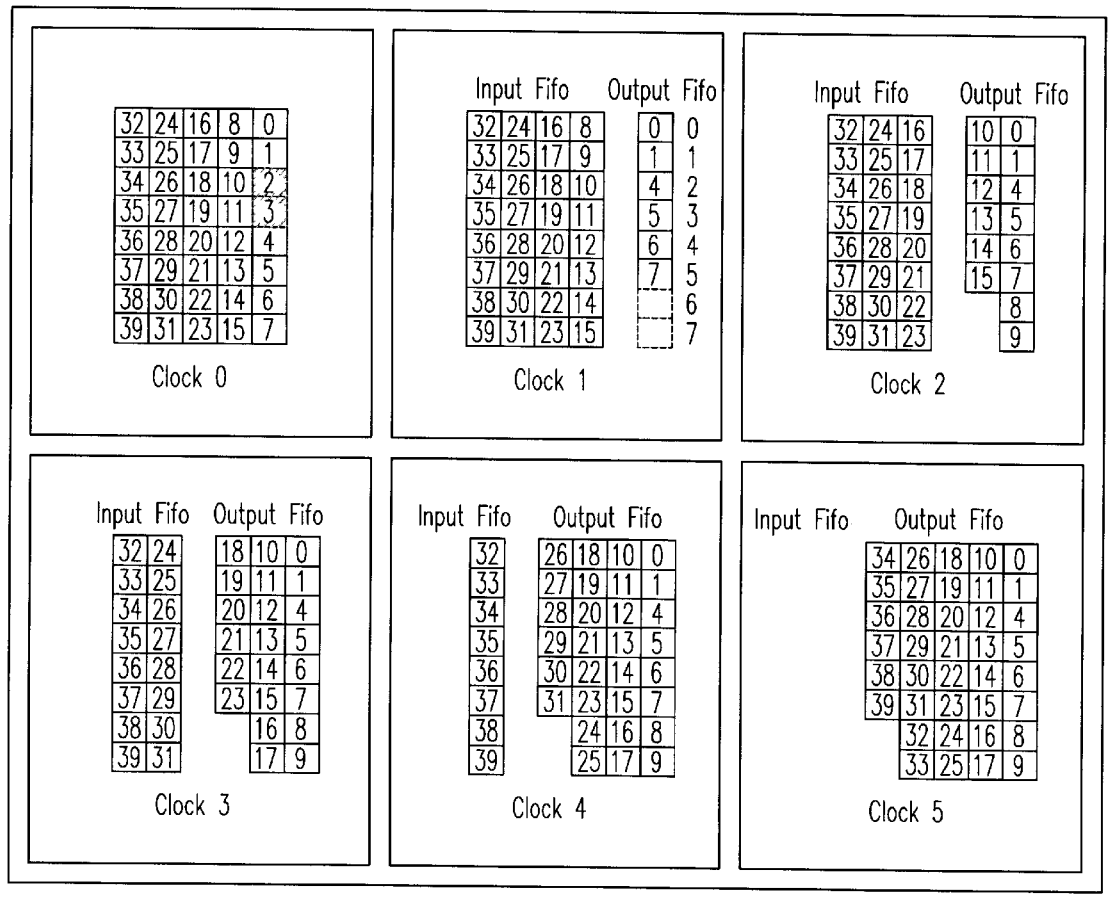
Figure 16:
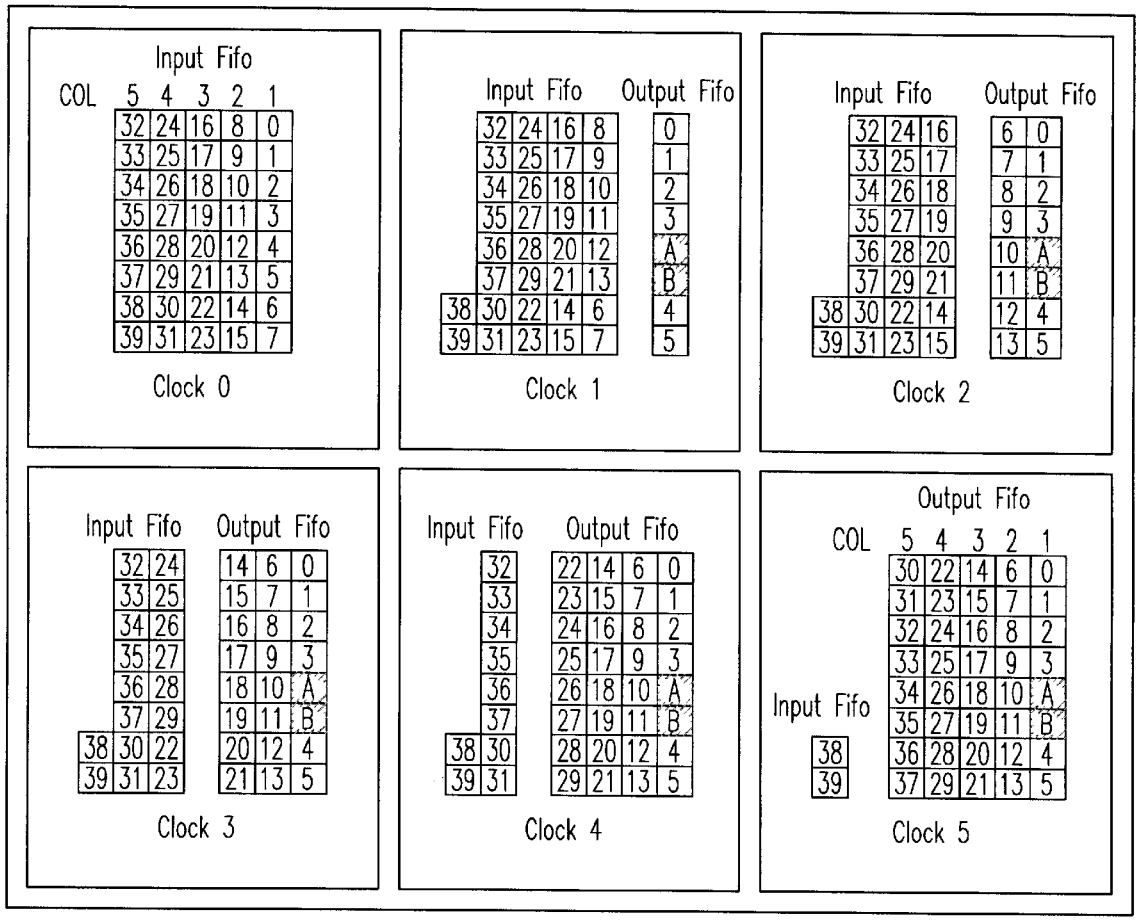

FIG. 14 details the Packet Forwarder interface from the Level 2 Header Unit in the system of FIG. 1; and FIG. 15 and FIG. 16 respectively illustrate, for successive clocks, the deleting and inserting of bytes from and into a data stream in accordance with the preferred algorithmic technique of the invention.

PREFERRED EMBODIMENT(S) OF INVENTION

Referring to FIG. 1, a hardware design for functionally processing a level 2 header unit in accordance with the invention (labeled "L2 Header Unit",) is presented, involving basically two sections—this L2 header unit and a sequencer unit, so labeled. An Input Packet Source feeds to an input FIFO stream, shown as the "wide data bus" at $B^1$, applying the input FIFO data stream (upper left in FIG. 2) to the ingress of the L2 Header Unit. The L2 Header Unit performs header manipulation or adaptation under the guidance of the sequencer unit, also fed input FIFO data from the bus $B^1$.

The interface of the Input Packet Source, as is conventional, has Data and Control FIFO's (not shown) with the latter triggering the sequencer to start the processing of the packet data in the Data FIFOs, using the packet byte count and status in the Control FIFO, and extracting the correct amount of data from the Data FIFO as is well known.

The data from the Level 2 header unit, ends up in the Packet Forwarder unit in FIG. 1, generating a FIFO output stream (far right in FIG. 2) along the further wide data bus B". On the ingress of the networking node, Packet Forwarder may be a Header lookup unit to direct traffic to one of many egress ports on the networking node. On the egress of the networking node, Packet Forwarder may be an HDLC (High Data Link Controller) controller.

As for the Level 2 Header Unit egress interface, FIG. 14 is a block diagram of such a section disposed after the output FIFO, fed along the wide data bus B (shown as FIFOs 0–7). This interface is shown provided with buffer and packet boundary detectors, so labeled, wherein, on packet start, a buffer transfer of, say, 64 bits at a time will commence if the back pressure is off. End of the packet, as indicated by a computational unit later described in connection with FIG. 2. It will check for back pressure before starting a new packet. When sending a long packet, the egress interface on the L2 header unit should check the back pressure, say at every packet boundary, if the output has storage for at least one worst case packet size; otherwise, at a byte boundary.

The sequencer unit in FIG. 1 uses a block of memory shown as Write Control Store (WCS), which is a long word instruction set of the 200 bits, later discussed. The L2 header unit generates output FIFO data streams along the further wide data bus B" and also has two other buses which are not wide but are basically control buses indicating the size of the packet and the header/statistics (Hdr Stat/Pkt Size), such as, for example, what kind of errors were found in the header, etc. The other may be a general purpose 10–15 bit bus which may provide more information about the header, also shown in later-discussed FIG. 14.

An example of useful parameters for the Input Packet Source interface operation (see FIG. 1), where the interface is mastered by the Input Packet Source on a packet level basis (on a per word basis the L2 Header Unit will be master) is an interface of 8 FIFOs, each of at least 1K by 8 bits deep, and another FIFO (not shown in FIG. 1) which is 1K by 16 bits deep. The first 8 FIFOs are the before-mentioned Data FIFO and the last one is the Control FIFO. The Control FIFO may have two fields, Packet Status and Packet Size. The Input Packet Generator can put up to an 8 k size byte packet in the Data FIFO and then write to the Control FIFO. The Control FIFO should set the FIFO Not Empty bit which triggers the sequencer, as later discussed, to start processing the packet in Data FIFO, using the packet byte count and status in the Control FIFO. An Input Packet Generator, as an example, could be an HDLC Controller on the ingress of a networking node; on the egress of a networking node an Input Packet Generator may be an output from a QoS (Quality of Service) device.

Figure 2:
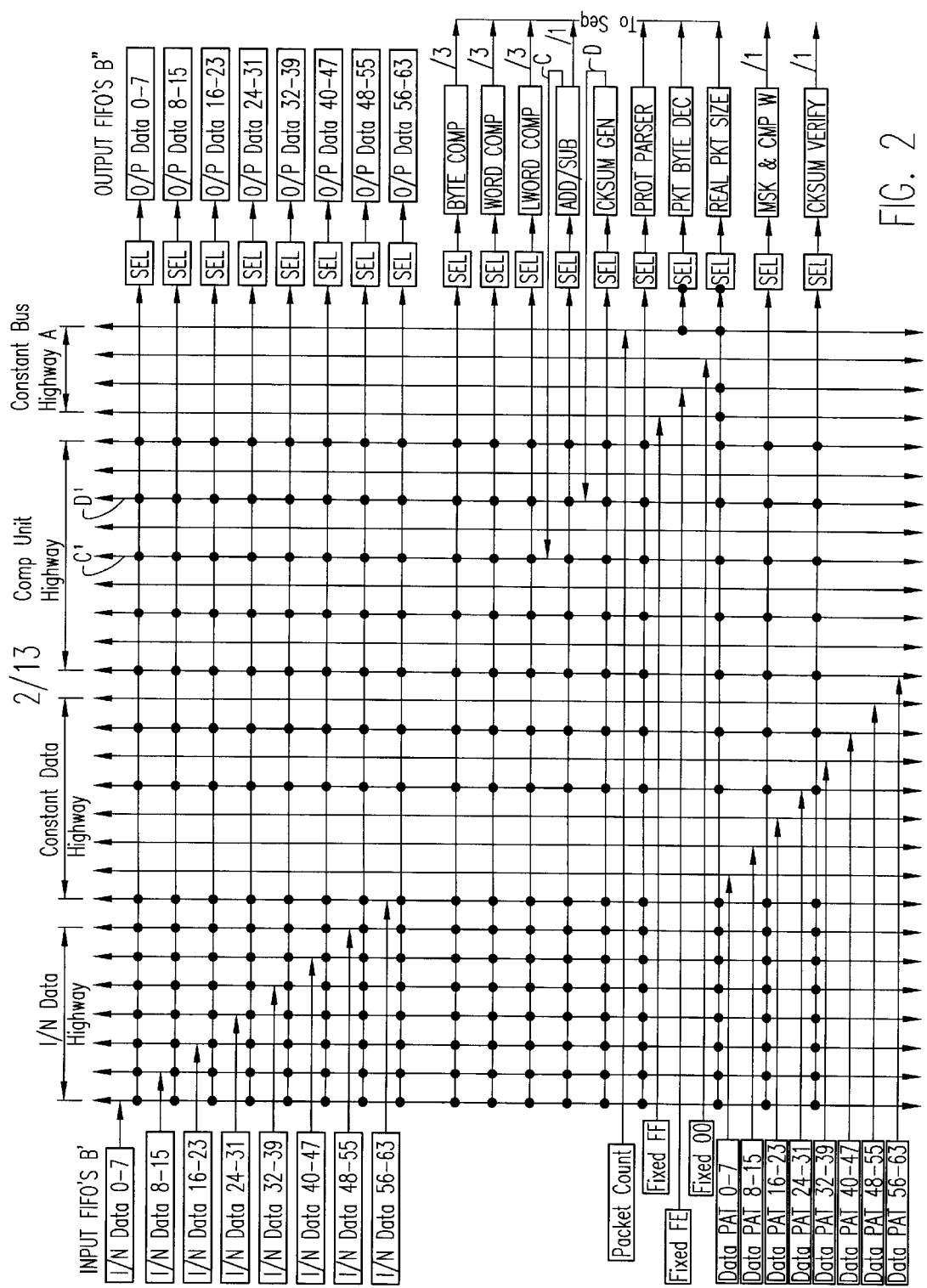
FIG. 2 is a preferred forwarding table data base and API specification diagram and matrix for the header unit, showing input data and output data interconnections and other database functions.

In FIG. 2, a forwarding table database and functional flow diagram is provided showing the input FIFOs at the far left and the output FIFOs at the far right, respectively inputting I/N DATA to successive I/N DATA Highway vertical lines at the left, and outputting O/P DATA from Computation Unit Highway vertical lines at the right, via SEL selection logic controlled by the sequencer unit. Also illustrated are intermediate sets of Constant Data Highway vertical lines and a right-hand set of Constant data bus lines ("CONST BUS"). The matrix of connections amongst the highway lines is illustrated by horizontal line cross connections.

Unlike the serial stream processing of datagrams of the prior art, all subject to the earlier mentioned reduced header processing times at very high speeds of serial streaming, the present invention processes, rather, in a parallel fashion, such that the serial stream is divided up into a plurality of small groups of bytes of data. In FIG. 2, an exemplary operation of I/N DATA groups is shown, respectively inputting to successive of the vertical I/N DATA Highway lines in parallel, 0–7, 8–15 . . . 56–63 bits of the input FIFO data. On the right-hand side, the data is parallely outputted from corresponding O/P Data Units from a Constant Bus Highway lane A, FIG. 2, as output FIFOs preceded by corresponding selectors SEL, as before stated. Through the sequencing matrix switching, the selectors allow any one of the output data streams to pick any one of the input data streams, so as to have complete access of the output FIFOs to any of the input FIFOs, with the multiplexing selectors controlled by a micro-coded instruction set. The instruction set is stored in the Write Control Store (WCS of FIG. 1) and dictates which output should choose which input.

In addition to the information data streams, moreover, computational units are provided, shown at the bottom right of FIG. 2 and identified as byte compare (BYTE COMP), word compare (WORD COMP), long word compare (L WORD COMP), add or subtract (ADD/SUB), checksum generation (CK SUM GEN), protocol parser (PROT PARSER), byte count decrementor (PKT BYTE DEC), real packet size generator (REAL PKT SIZE), mask and shift and compare (MSK & CMP W), and checksum verify (CK SUM VERIFY). These are small chunks of the algorithmic computations needed in order fully to process incoming data from the input unit. These computational units are also shown preceded by corresponding selectors (SEL), adapted to select any of the incoming data streams, also under switching programming by the micro-coded engine associated with the sequencer.

These computational units either create outputs which become a product of the same multilane highway (such as CKSUM GEN, ADD/SUB, etc. in FIG. 2), or generate an output which is used by the micro-coded engine to make decisions (such as the feedback at C and D of ADD/SUB and CKSUM GEN) labelled as To Seq in FIG. 2.

For example, the checksum generator generates an output D, which becomes an independent bus and no other computational units enable data on that bus. It has its own separate highway upward bus $D^1$; the third vertical line in from the right of the Computational Unit Highway. The selectors of the output FIFO not only can select input FIFO streams, but can also select the results of the computational units, in effect making the multilane highway an M*N switch (N being the total number of busses to select among, and M, the number of byte busses being selected on the O/P Data FIFOs). The selectors preceding the output FIFOs can select anyone of the Ns of these multilane highways—the microcode program selection running this engine.

There is also need sometimes to insert constant data inside the headers. These data bytes are also available as data pattern successive groups (DATA PAT) 0–7, 8–15, etc. shown at the bottom left-hand section of FIG. 2. Each of the data pattern groups is connected in parallel to and has its own independent vertical bus labeled as data pattern in the Constant Data Highway set. The selectors SEL that select the output FIFOs can also choose to use these data patterns as one of their inputs to the FIFO. So, basically, the output selectors SEL have three different choices of data selection and in any desired combinations: (1) is input FIFO; (2) computational units; and (3) the data patterns themselves. This design thus enables specific header modifications, manipulations, adaptations, changes or translation, as earlier discussed, and more fully exemplarily illustrated hereinafter.

Using this multilane highway for this purpose, for example, 64 bits of data can be processed in one clock, thereby reducing the speed of the wire by 64 times while achieving the same processing. In the case of an OC48, for example, running at 2.4 gigabytes per second, it is only required to process data at 2.4 gigabytes divided by 64—something of the order of 40 megahertz—such running of a clock at 40 megahertz and processing 64 bits of data being quite feasible in today's technology. If it is later desired to scale to OC192, as another example, all that has to be done is to process about 200 bits at a time, readily enabling scaling beyond the current requirements.

In summary, thus, in the Level 2 design, there are n bytes (8 bytes) incoming from the Input Packet Source interface, data from which enters a small depth FIFO called the input FIFO. On the sequencer controlled time, the data from the input FIFO is put on the n byte busses of the M*N non-blocking matrix highway switch. Each of the output FIFOs is preceded by a selector, which multiplexes M byte busses onto the output FIFO. The selectors and/or the O/P FIFOs are controlled by the sequencer. The input and output FIFOs are controlled by the WCS, FIG. 1 and FIG. 13.

Besides the input FIFOs, there are other units that put data on the M*N switch. First, are some constant data registers putting results on the Constant Bus (packet count and fixed FF, FE and 00, lower left in FIG. 2). Second, are some variables that come from the sequencer that drive the Data Pattern bus; and then lastly there are combinatorial computational units that sink their results on the Computation Bus.

Any sink of data from any of the above-mentioned units should be complete before the next clock of the selectors of the output FIFO. There are some combinatorial units that are used to compare input data streams with constants or variables and which do not put the results on the M*N switch but, rather, send the results to the sequencer for doing conditional jumps.

Another advantage of the design of the invention resides in the fact that complex header processing is now really broken down into very simple computational units like compare, word compare, long-word compare, add and subtract, checksum generation, protocol parser, and so on, as before explained. These little engines of the computational units are of much simpler designs than a unit designed to do a specific type of header manipulation. Still a further advantage of this design resides in its generic character such that it can process multiple types of headers, particularly because most of these computational units are similar and most of the header processing that is required is data packet processing. The same unit that can be used for HDLC, can be used also for frame relay, for PPP (Point-to-Point Protocol), and for IP header processing of Internet packets, and for ATM (Asynchronous Transfer Mode); all because the solution is very generic and does not require additional hardware. The invention additionally allows for multiple types of headers on a given datagram, the processing using the same engine but a different microcode, and all at low speeds compared to the data speed, and scalable basically by increasing the number of highway lines.

Figure 11:
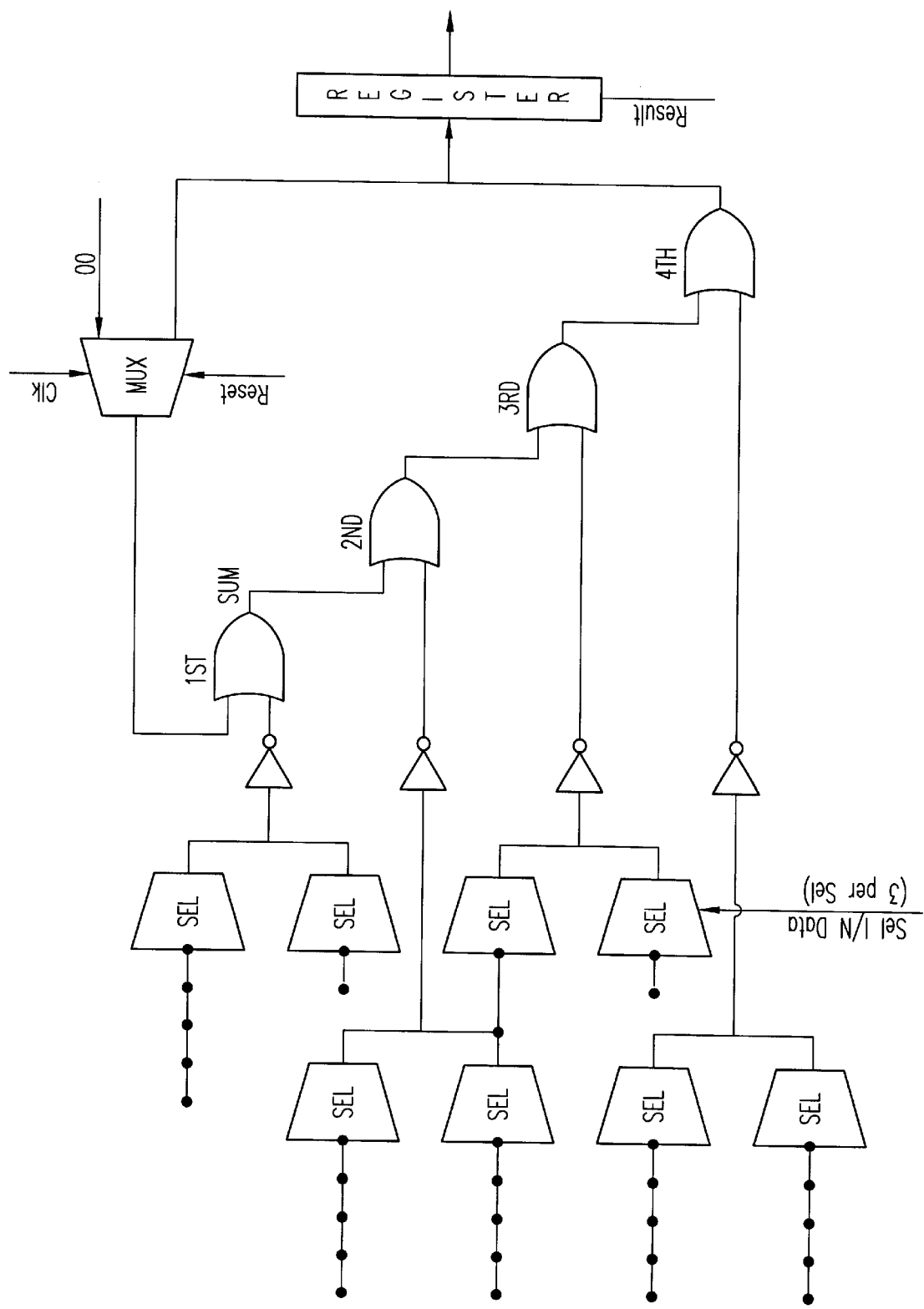

The output selectors, as before explained, allow data to be picked up from any of these highways and put on the output data strand and with one clock processing 64 bits. It is now in order to demonstrate the simplicity and operation of these computational units, as illustrated in FIG. 3 FIG. 11.

Figure 3:
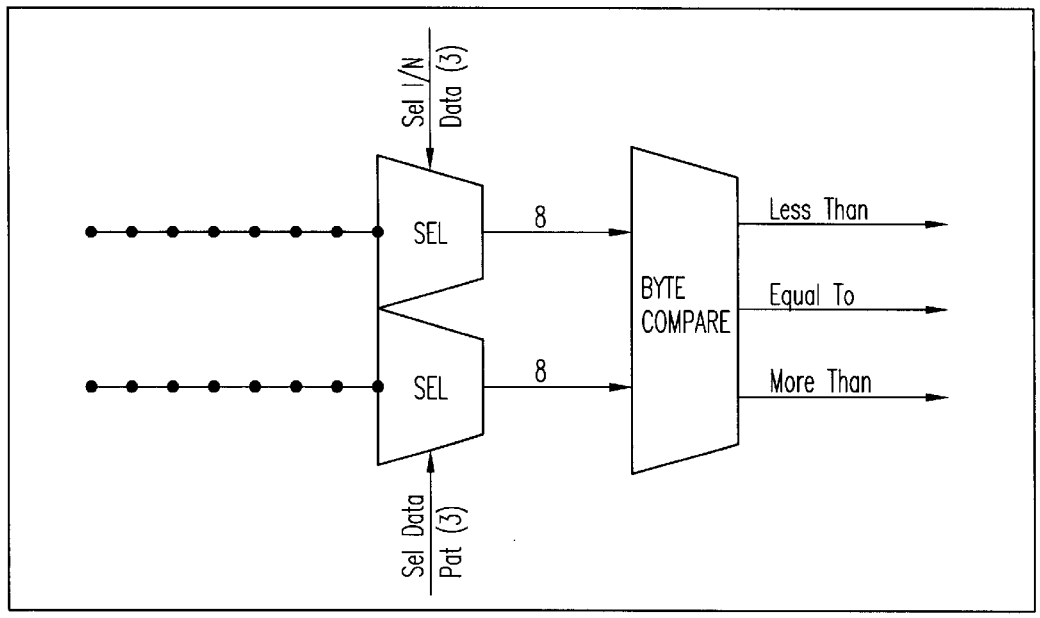
FIG. 3 is a sub-block diagram, upon an enlarged scale, detailing the byte compare combinatorial unit of FIG. 2.

In FIG. 3, the previously discussed byte compare combinational unit (BYTE COMP in FIG. 2) is shown. The byte comparison is of two sets of databytes which are represented by two rows of dots. These permit comparing any input FIFO byte to any constant or variable or any other data byte. These two rows of dots, corresponding to the dots on the busses in FIG. 2, indicate highways that they are connected to as controlled by the selectors; one selector in FIG. 3 also receiving data from the incoming data stream Sel I/N Data, and another from the data pattern highway Sel Data Pat, and then comparing the bytes to generate three outputs: less than, equal to, or more than. These three outputs then are fed to the micro-sequencer for a decision based on the results, as to what the next instruction should be.

Figure 4:
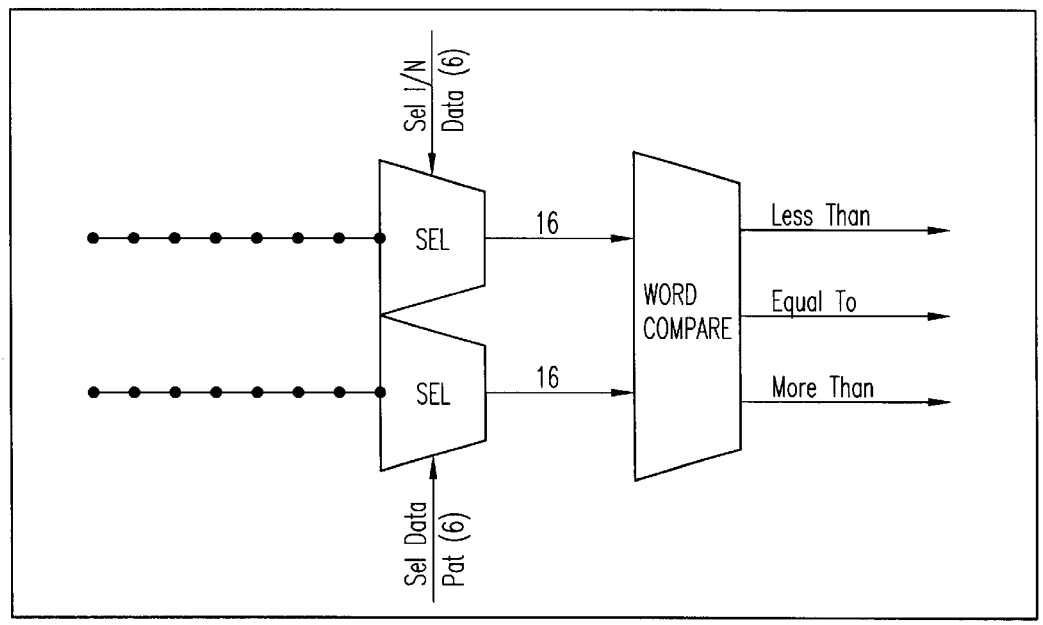
FIG. 4, FIG. 5 and FIG. 6 are similar diagrams of the details of respective word compare, long word compare and addition/subtraction combinatorial units of FIG. 2.
Figure 5:
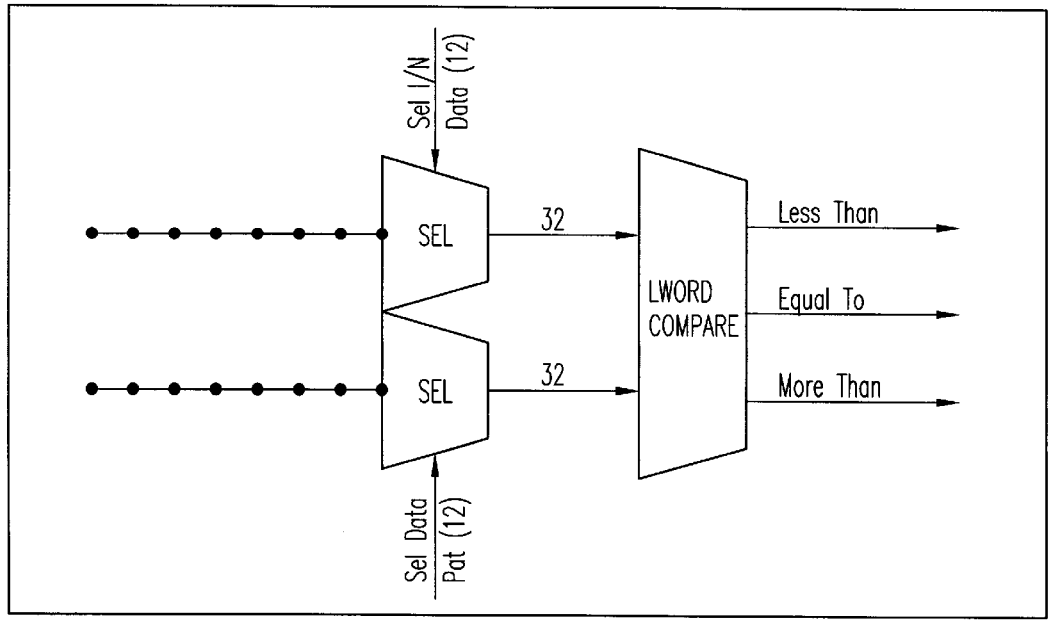

The word compare unit of FIG. 4 (WORD COMP in FIG. 2) has the same concept, but instead of doing 8 bit compares as in FIG. 3, this unit will do 16 bit compares. Similarly, the long word compare (L WORD COMP, FIG. 2) has the same concept, as shown in FIG. 5, but instead of 8 bits or 16 bits, it uses 32-bit comparison.

Figure 6:
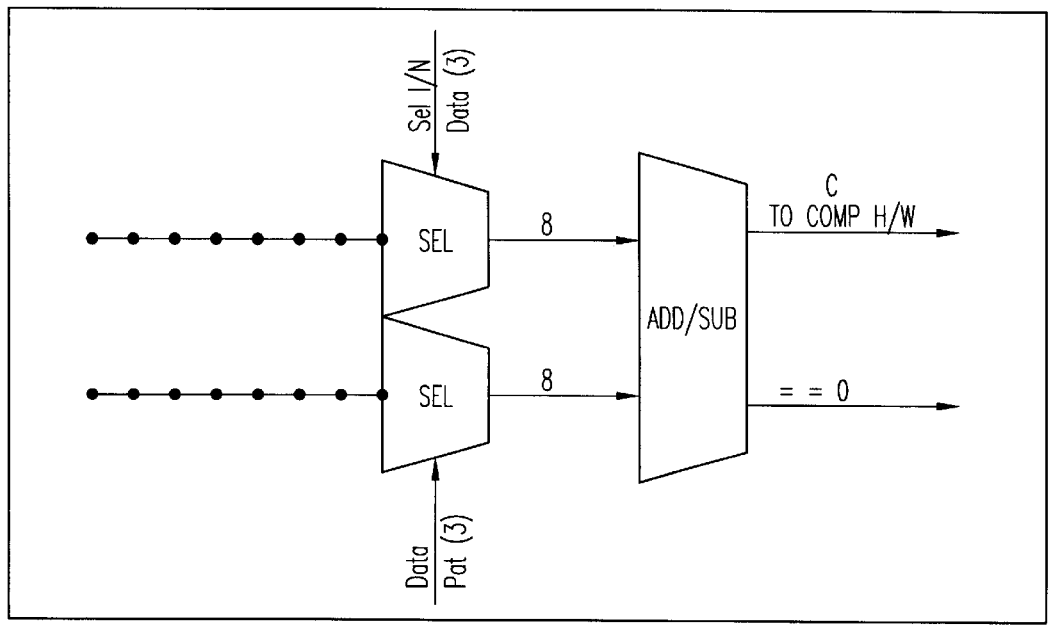

FIG. 6 details the add/subtract computational unit. It compares two strings of data, either the data from the input data highway or the data pattern highway, and it adds or subtracts, providing a result at C which ends up on one of the computation highway lines, shown at $C^1$ in FIG. 2 as the fifth vertical Computation Highway line from the right. It also generates from another output labeled "/1" in FIG. 2 and called an equal-to-0 bit, which can be used by the micro-sequencer for making decisions based on whether the result is 0 or not.

Figure 7:
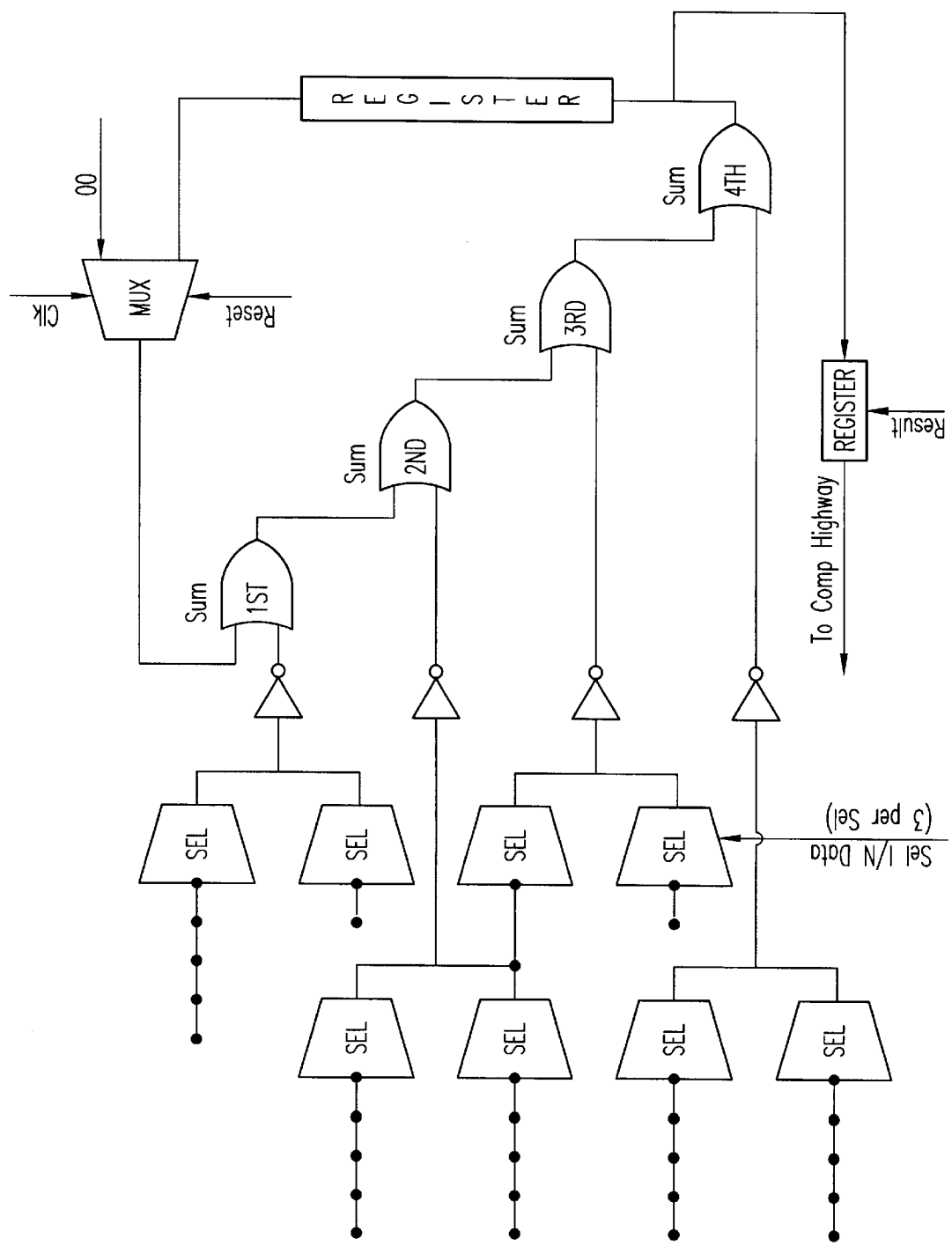
FIG. 7 is a diagram of details of a preferred checksum generator combinatorial unit of FIG. 2

Another computational unit is the before-mentioned checksum generator (CKSUM GEN in FIG. 2), checksum generators being used also on the Internet where IP packets have to generate the checksum with a fixed, now well-known algorithm. FIG. 7 shows how the checksum may be generated. There is a cascaded set of adders, $1^{st}$ through $4^{th}$, labeled "sum" in the drawing, preceded by selectors SEL taking data from the input I/N data units. The result is fed into a register, so labeled, which then goes to the Computation Unit Highway, shown connected to the second vertical Computation Unit Highway line at $D^1$ in FIG. 2. At the appropriate time, the micro-sequencer will select the output of this register to go onto the data stream in the output FIFO. The checksum is generated at link speed which is normally one of the most difficult functions to do on an IP header at 0C48 or 0C192 or 0C768. With the design of the invention, however, the checksum generation is much easier and faster because, the design is working on multiple bits at the same time. The multiplexer MUX in FIG. 7 (upper right) is used during startup when a data packet comes in, to initialize the multiplexer with a 00. This multiplexer will take the 00 stream and give it to the first sum unit on startup of the packet. In subsequent clocks, the 00 stream is used, but the result of the $4^{th}$ "sum" or adder is used to feed the $1^{st}$ sum adder.

Figure 8:
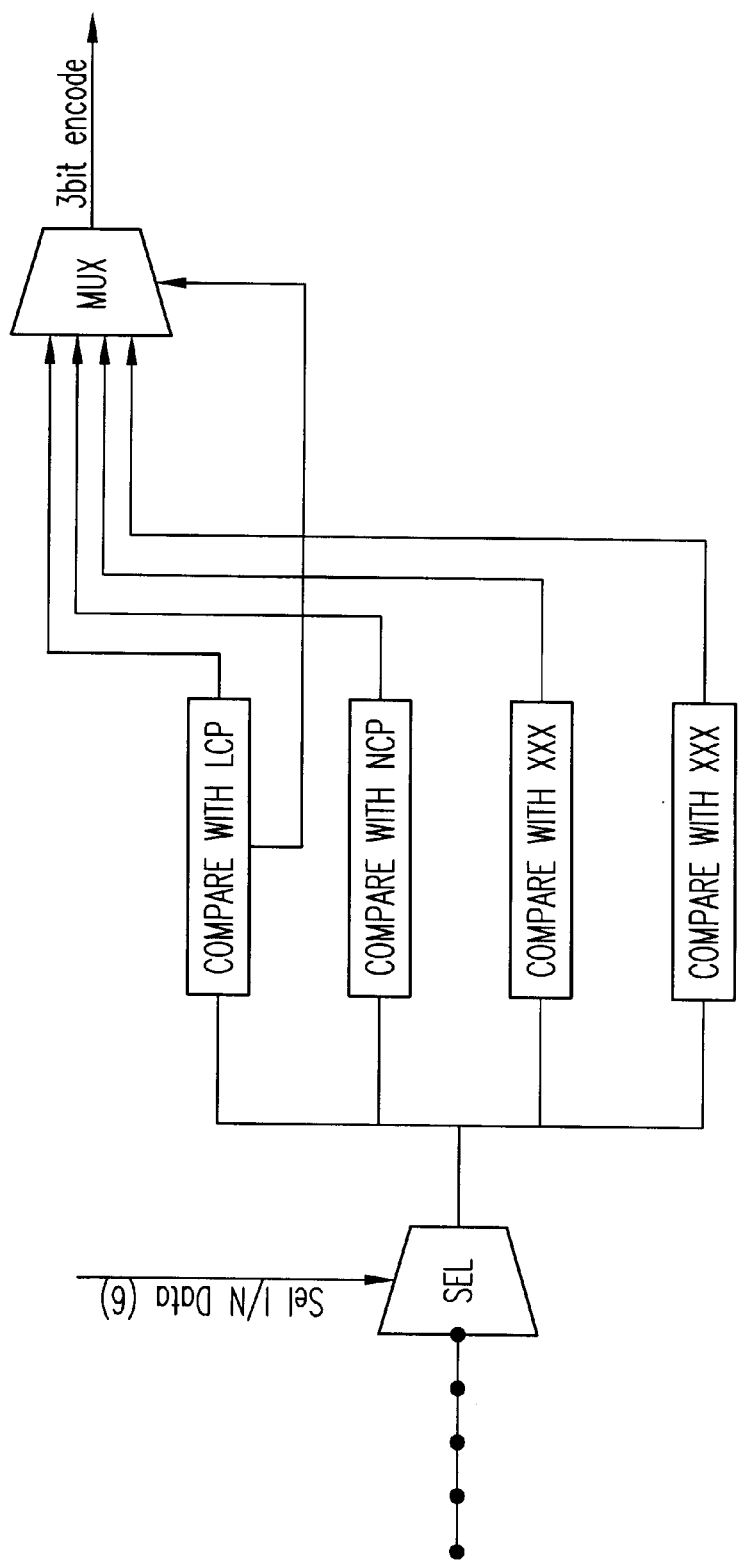
FIG. 8 is a similar diagram of the details of the protocol parser unit.

The protocol parser of FIG. 8 is simply a compare unit which compares different protocol types in a packet and encodes the results with a multiplexer on a three-bit encoder. The micro-code looks at the three-bit encoder and, based on the compares, knows the type of packet and can appropriately process. The compares are fed in by a selector which selects one of the input data streams from the input FIFO's.

Figure 9:
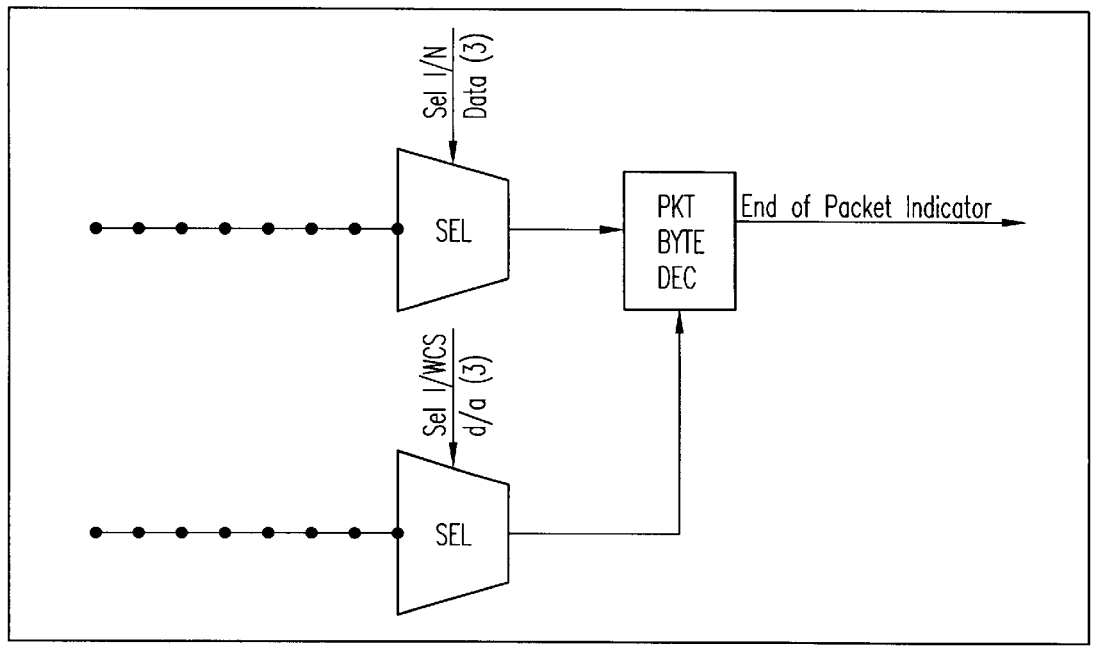
FIG. 9 illustrates the functioning of the byte count decrementor FIG. 2, and FIG. 10 and FIG. 11 respectively detail the make-shift and checksum verify combinatorial units.

In FIG. 9, the byte count decrementor of FIG. 2 is detailed, showing that by the time datagrams come from the network, the packet sizes are known and there is only need to know when the packet ends—this unit serving as a packet byte decrementor. It gets initialized in the starter packet to the number of bytes in the packet, and is decremented whenever taken out of the input FIFO, generating an end of packet indicator for the sequencing as in FIG. 12.

Figure 10:
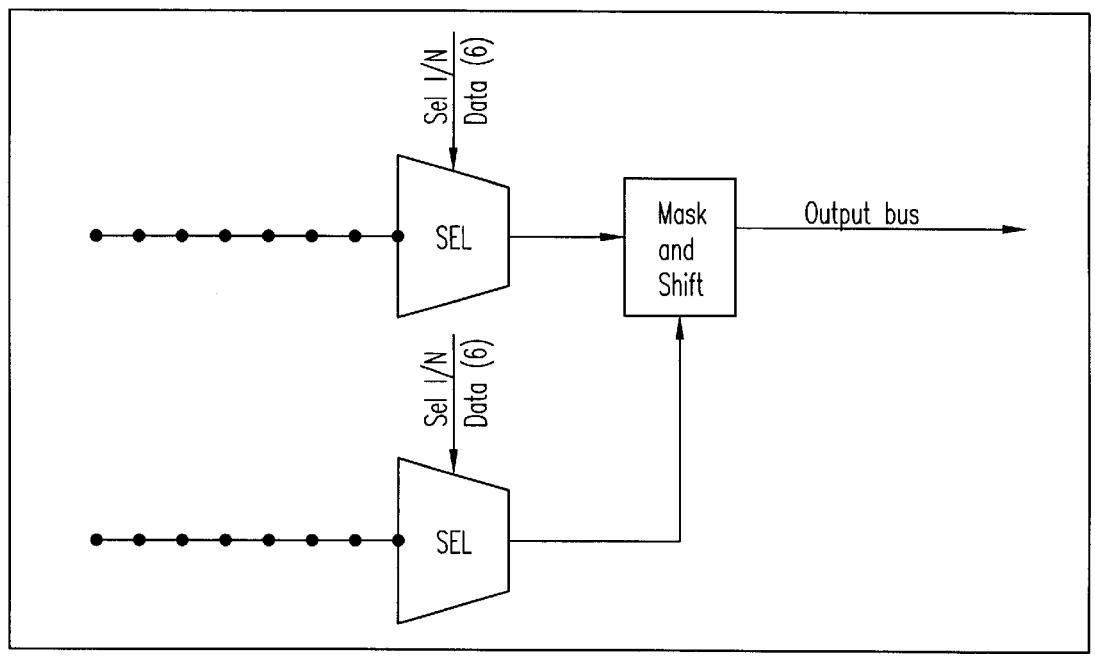

FIG. 2 also provides for another unit called the mask shift combinatorial unit and which is used for processing headers, as shown in FIG. 10. This mask and shift unit allows using the selectors to choose any of the input data streams and to shift and mask the data and put it out on, for example, an output bus for further processing by another unit, or back on the multilane highway (not shown in FIG. 2 and FIG. 10).

Another difficult function resides in the verification of the checksum that is already embedded inside an IP packet. FIG. 11 demonstrates how to do the verification of IP header checksums. It is very similar to the checksum generation unit previously described in connection with FIG. 7. There are four summers or adders that are cascaded together. The fourth adder feeds back to the first one . At the start of the calculation, 00s are fed into the first one. The algorithm of this computorial unit generates a bit which indicates whether the header has a correct checksum or not—good or bad.

It is now in order to examine how, on a clock by clock basis, bytes may, for example, be changed from an input FIFO stream and transferred into the output FIFO stream as for header modification or manipulation in accordance with the invention. Referring to FIG. 15, the technique for deleting data bytes is there outlined. At "Clock 0, before anything starts, the input FIFO is shown having 40 bytes of data, 0–39, and the output FIFO has nothing and is accordingly not shown. As an illustration, suppose the goal is to delete bytes 2 and 3, shown shaded. Referring back to the multilane highway picture of FIG. 2, selectors SEL associated with the output FIFOs and I/N Data Units from the input FIFOs are correspondingly numbered 0 through 7. The right-hand column of bytes data in FIG. 15 is numbered with column numbers 0–7, also. Selector (SEL) 0 and the output FIFO point to data byte 0. Selector SEL 1 points to data bytes 1 and selector 2 will point to data bytes 4 to indicate that bytes 2 and 3 are not being selected and therefore would not appear in the output FIFO. Selector 3 will now point to data bytes 5; selector 4, to input data bytes 6; and selector 5 to data bytes 7. After the end of the first clock, since input data bytes 2 and 3 were not selected, they will not advance to the output FIFO. They are, however, clocked out of the input FIFO, so that the resulting picture appears as is shown in the next "Clock 1" block. The output FIFO streams 6 and 7 have been shown dotted and do not have anything in them. At the end of "Clock 2", however, the result will appear as shown in the block labeled Clock 2 as will now be explained. This process is repeated until the rest of the data is clocked out in the next three clocks, Clocks 3, 4 and 5 of FIG. 15, with the respective FIFO advancing being controlled by the selector indicated in FIG. 12.

The following is a more detailed summary of deleting of bytes from the input FIFO stream and their insertion on the output FIFO stream as illustrated in the example of FIG. 15, where the input FIFO has a forty byte packet and the goal is to delete bytes 2 and 3, marked as gray shading. The flow on a clock by clock basis is as follows:

Clock 1

During clock 1, the output FIFO selectors are aligned such that the selector 6 points to data 0, selector 1 points to data 1, selector 2 point to data 4, selector 3 points to data 5, selector 4 points to data 6, and selector 5 points to data 7. At the end of the cycle, all 8 input FIFO Advancers are set, and 0–5 output FIFO Advancers are set. This generates a partial word in the output FIFO as shown in the block for Clock 1, Clock 2

Figure 12:
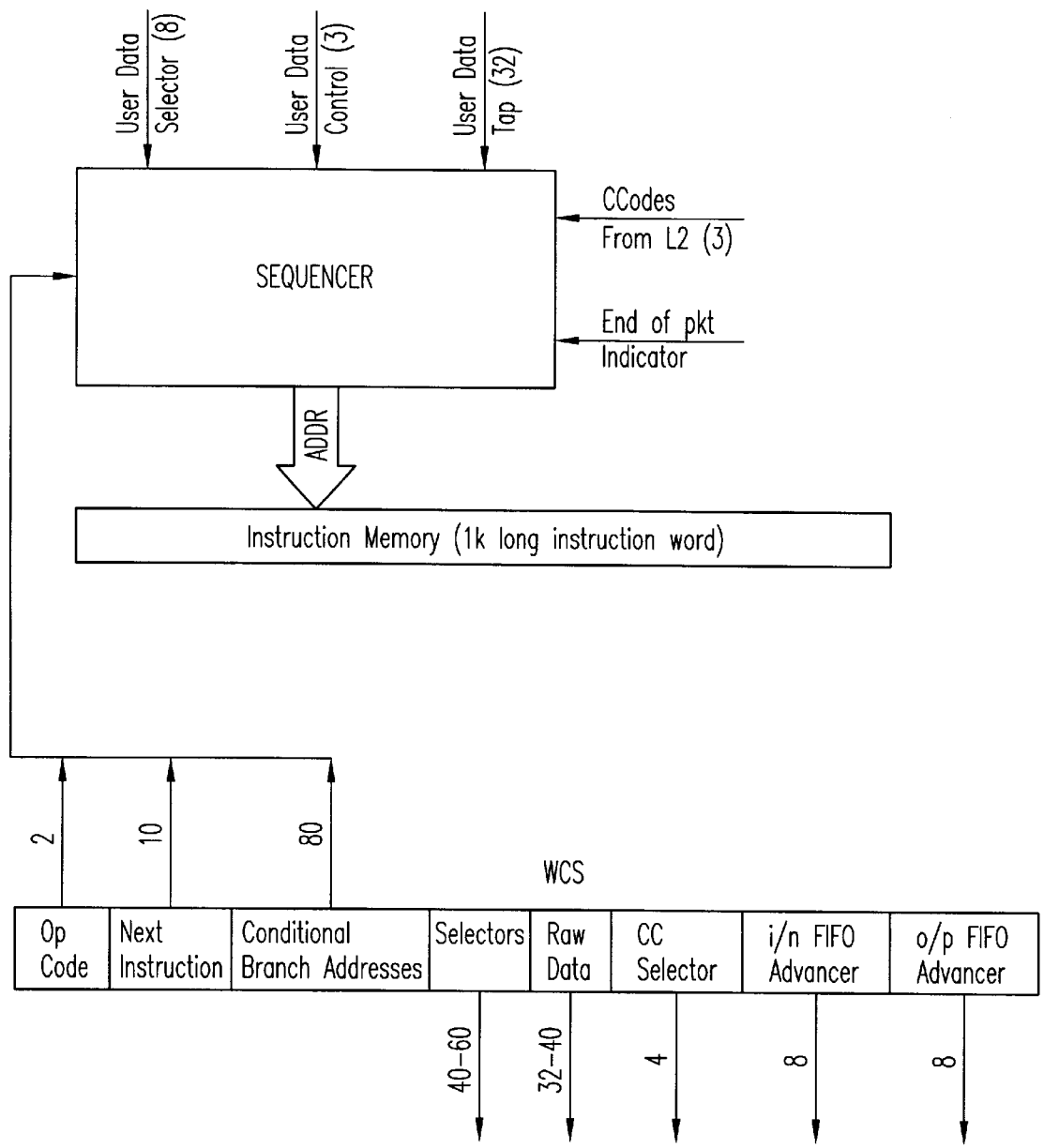
FIG. 12 shows the details of the sequencer unit of FIG. 1 in functional block diagram form.

During clock 2, the output FIFO selectors are aligned such that selector 6 points to data 8, selector 7 points to data 9, selector 0 points to data 10, selector 1 points to data 11, selector 2 points to data 12, selector 3 points to data 13, selector 4 points to data 14, and selector 5 points to data 15. At the end of the cycle, all 8 input FIFO Advancers are set, and all output FIFO Advancers are set (FIG. 12). This will load all 8 bytes from the input FIFO to the output FIFO. Bytes 8 and 9 will trickle down to the end of the output FIFO, aligning nicely with the first six bytes of clock 1.

Clock 3

During clock 3, the output FIFO selectors are aligned such that selector 6 points to data 16, selector 7 points to data 17, selector 0 points to data 18, selector 1 points to data 19, selector 2 points to data 20, selector 3 points to data 21, selector 4 points to data 22, and selector 5 points to data 23. At the end of this cycle, all 8 input FIFO Advancers are set, and all output FIFO Advancers are set. This will load all 8 bytes from the input FIFO to the output FIFO. Bytes 16 and 17 will trickle down to the end of the output FIFO, aligning with the first six bytes of clock 2.

Clock 4

During clock 4, the output FIFO selectors are aligned such that the selector 6 points to data 24, selector 7 points to data 25, selector 0 points to data 26, selector 1 points to data 27, selector 2 points to data 28, selector 3 points to data 29, selector 4 points to data 30, and selector 5 points to data 31. At the end of this cycle, all 8 input FIFO Advancers are set, and all output FIFO Advancers are set. This will load all 8 bytes from input FIFO to the output FIFO. Bytes 24 and 25 will trickle down to the end of the output FIFO, aligning with the first six bytes of clock 3.

Clock 5

During clock 5, the output FIFO selectors are aligned such that selector 6 points to data 32, selector 7 points to data 33, selector 0 points to data 34, selector 1 points to data 35, selector 2 points to data 36, selector 3 points to data 37, selector 4 points to data 38, and selector 5 points to data 39. At the end of the cycle, all 8 input FIFO Advancers are set, and all output FIFO Advancers are set. This loads all 8 bytes from the input FIFO to the output FIFO, and bytes 32 and 33 will trickle down to the end of the output FIFO, aligning with the first six bytes of clock 4.

It should be observed that the output FIFOs 0–5 have been clocked five times, whereas the output FIFOs 6–7 have been clocked only four times. To avoid problems at packet boundaries, the microcode is informed of the end of a packet, (FIG. 12) to make sure that the output FIFOs are aligned. For a given packet, the above mentioned misalignment cannot be more than one clock. To make all the FIFOs aligned, the output FIFO advancers (FIG. 12) can be instructed to clock FIFOs 6–7 one extra time at the end of packet indicator, the end of packet indicator being a signal generated as shown in FIG. 9.

The output FIFOs thus present sequential data from 0–39 with bytes 2 and 3 missing. This M*N matrix multilane highway and the selectors of the invention have thus provided a mechanism for deleting bytes in the data stream without creating a hole in the output FIFO—automatically rotating by eliminating the space created by the two bytes and also without losing any clocks. Within five rows of data, accordingly, in this example, two bytes have been eliminated at blind speed.

A similar example is shown in FIG. 16 for inserting bytes A and B from the data pattern highway into the byte stream labeled 0–39; specifically, in this example, inserting bytes A and B between the input byte stream bytes 3 and 4. To effect this, in accordance with the invention, the selectors on the output FIFO have to be pointed as follows: During Clock 1: selector 0 points to data 0; selector 1, to input data bytes 1; selector 2, to data bytes 2; selector 3, to data bytes 3; selector 4 points to data bytes A which come from the input Constant Data Highway; selector 5, to data B from the same highway; selector 6, points to data bytes 5; and selector 7 points to data bytes 6. So, in one clock, two bytes A and B have been added that are contributed from the constant data highway and inserted between data bytes 3 and 4. The rest of the clocks basically rotate the selectors to accommodate the rest of the byte stream. Without losing time, therefore, new bytes A and B have thus been inserted into intermediate locations in the output FIFO stream and without losing any of the data bytes, producing an output data stream 0,1,2,3,A,B,4,5,6,7,8, etc, with the columns labeled 2–5 in the Clock 5 block of FIG. 16, rotated by 2 data bytes in Clock 5 from Clock 0. Thus, for example, in column 2, Clock 0 in FIG. 16 starts out with 8, whereas in Clock 5, column 2 starts out with 6. The M*N multilane highway operation of the invention results in rotating the input FIFO byte stream and enabling, as a result of computation logic, the data bytes A and B to be inserted into the data stream.

The invention, accordingly, has provided for the processing of packets to manipulate, change or translate headers at very high wire speed, but using low clock speeds and while using current technology. As before noted, packets may be processed up to (and beyond) about 10 gigabytes per second, with the invention permitting such, while using low clock speeds of around 40–50 megahertz. The technique of the invention may also be scaled as previously explained—and may be used with higher clock speeds as well; say, for example, around 100 megahertz, etc.—but still low compared to the very high data rates.

A functional block diagram of the operation of the sequencer unit of FIG. 1 is presented in FIG. 12, earlier referenced in connection with the advancing of the input and output FIFOs and with reference to the end of the packet indication. The sequencer is shown provided with memory for long instruction words. If desired, moreover, the sequencer could monitor some of the data passing on to the L2 header unit of FIG. 1 and FIG. 2, such as with the HDLC passing the packet size and state of the packet information (REAL PKTSIZE in FIG. 2) for examination by the sequencer before passing on to the L2 header unit.

The sequencer runs on the same clocks as the L2 header, as shown by the first waveform and fourth waveform from the top in FIG. 13, at, for example, approximately 50 mHz; and, as previously discussed, is tied to a very large Write Control Store (WCS), FIG. 1, which, as previously explained, drives both the L2 header unit and the sequencer. The various fields of the WCS are schematically shown in FIG. 12 as blocks labeled OP code, Next Instruction, Conditional Branch, Addresses, Selectors, Raw Data, CC Selector, and the before-discussed I/N FIFO and O/P FIFO Advancers. The Next Instruction function will tell the sequencer to jump to the next instruction; the Conditional Branch, to jump to one of the multiple addresses in its address field, each one representing the next possible address, if the current instruction is a Conditional Branch, the Selectors field being used for the selectors on the L2 header unit. The Raw Data field is used for L2 header unit comparisons of output FIFO data, or masking, etc. as earlier described.

The timing of the sequencer clock relative to the L2 header clock, and with reference to input FIFO data, the before-discussed combinatorial calculations, and output FIFO set-up time, etc., is presented in FIG. 13, demonstrating the relative operational timing of the WCS and L2 header units of FIG. 1.

While the invention has been described as applied to the important problem of header datagram manipulation for network interfacing, the data stream manipulation technique of the invention is also more generally useful with other data stream adjustments, as well, and further modifications will occur to those skilled in this art, and such are considered to fall within the spirit and scope of the invention as defined in the appended claims.

What is claimed is:

1. A method of changing and manipulating datagram headers of packets of serial data streams of predetermined rate as required during traverse from one interface of a networking device to another, that comprises, dividing input FIFO serial data streams into a plurality of smaller successive groups of bytes of data; forming a matrix of successive multi-lane highway busses for each of input data, data patterns, computational units, and constant bus lines; applying each of the successive groups of bytes of input data to a corresponding successive input data highway bus lane and in a parallel fashion; connecting computational bus lines of the matrix to output FIFOs corresponding respectively to the input FIFOs and through respective selectors; clock-sequencing the operation of the selectors in accordance with various predetermined logic sequences for switching in the matrix the selection of data fed through the selectors to their output FIFOs in desired combinations selected from the FIFO input data, the results of the computational units, and the data patterns, and thereby manipulating the datagram header data stream as desired; and setting the clocking rate to a value low compared to the data stream rate.

2. The method as claimed in claim 1 wherein the rate of the clock sequencing is set of the order of tens to hundreds of megahertz for data stream rates of the order of multiples of G bits/sec.

3. The method as claimed in claim 1 wherein scaling is effected by increasing the number of multi-lane highway busses.

4. The method as claimed in claim 1 wherein the data patterns are produced by generating a plurality of successive groups of successive bytes of data representing data patterns and applying each of the successive groups of data patterns to a corresponding successive data pattern highway bus lane, and in parallel fashion.

5. The method as claimed in claim 1 wherein the computational units connected with the computational unit highway bus lanes generate outputs resulting from one or more of byte word and long word comparisons, byte stream addition and subtraction, checksum generation and verification, protocol parsing and mask-shift combinatorial operation, and the outputs are passed through corresponding selectors controlled by said sequencing.

6. The method as claimed in claim 1 wherein fixed or constant data relating to packet parameters are applied to constant bus lines of the multi-lane matrix.

7. The method as claimed in claim 1 wherein computation is effected to output from constant bus lines packet byte decrements and real packet size.

8. A method of manipulating data streams during network interfacing, that comprises, interposing a matrix of a multilane highway of input data stream, constant data pattern, computational and constant line busses between input and output FIFO serial data streams; dividing the input FIFO serial data streams into small groups and feeding the groups parallely into input data busses; dividing the output FIFOs into corresponding small groups connected by corresponding selectors to computational unit busses to provide group outputting in parallel; clock micro-sequencing selectors in accordance with various predetermined logic sequences for switching in the matrix the selection of data fed through the selectors to their corresponding output FIFOs and in desired combinations selected from the input FIFO data, the results of the computational units, and the data patterns, thereby manipulating the data streams as desired.

9. The method as claimed in claim 8 in which said manipulating includes one or more of deleting and increasing data bytes from the input FIFO data-streams and inserting data patterns and computational results.

10. The method as claimed in claim 9 and in which the FIFO data streams comprise datagram headers that are to be manipulated for network interfacing.

11. The method as claimed in claim 9 wherein an original datagram header suitable for a first network is passed therethrough and then manipulated, and the manipulated datagram header is then applied to a second network for which said manipulated datagram and not the original datagram header is suitable.

12. The method of claim 11 wherein the rate of the clock sequencing is set of the order of tens to hundreds of megahertz for data stream rates of the orders of multiple of G bits/sec.

13. The method as claimed in claim 12 wherein the clock rate is about 40–100 megahertz and the data stream rates about 10 G bits/Sec and higher.

14. The method as claimed in claim 13 wherein the data stream rates correspond to those required for from 0C48 to 0C192 operation.

15. Apparatus for changing and manipulating datagram headers of packets of serial data streams as required during traverse from one interface of a networking device to another, having, in combination, a plurality of input serial data stream FIFOs divided into a plurality of smaller successive groups of bytes of data; a matrix of successive multi-lane highway busses for each of input data, data patterns, computational units, and constant bus lines; means for applying each of the successive groups of bytes of input data to a corresponding successive input data highway bus lane and in a parallel fashion; means for connecting computational bus lines of the matrix to a plurality of output FIFOs corresponding respectively to the input FIFOs and through respective selectors; a clock-controlled sequencer for switching the selectors in accordance with various predetermined logic sequences to select data fed through the selectors to their output FIFOs in desired combinations selected from the FIFO input data, the results of the computational units, and the data patterns, and thereby to manipulate the original datagram header data stream as desired; and means for setting the clocking rate to a value low compared to the data stream rate.

16. Apparatus as claimed in claim 15 wherein the rate of the clock sequencing is adjusted to the order of tens to hundreds of megahertz for datastream rates of the order of multiples of Gbits/Sec.

17. Apparatus as claimed in claim 1 wherein means is provided for scaling by increasing the number of multi-lane highway busses.

18. Apparatus as claimed in claim 15 wherein the data patterns are produced by means for generating a plurality of successive groups of successive bytes of data representing data patterns and means for applying each of the successive groups of data patterns to a corresponding successive data pattern highway bus lane, and in parallel fashion.

19. Apparatus as claimed in claim 15 wherein the computational units are connected with the computational unit highway bus lanes to generate outputs resulting from one or more of byte word and long word comparisions, byte stream additions and subtraction, checksum generation and verification, protocol parsing, and mask-shift combinational operation, and the outputs are passed through corresponding selectors controlled by the sequence.

20. Apparatus as claimed in claim 15 wherein means is provided for applying fixed or constant data relating to packet parameters to said constant bus lines of the multi-lane matrix.

21. Apparatus as claimed in claim 20 wherein packet byte decrements and real packet size computation results are outputted from said constant bus lines.

22. Apparatus for manipulating data streams during network interfacing, having, in combination, a matrix of a multilane highway of input data stream, constant data pattern, computational and constant line busses interposed between input and output serial data stream FIFOs; means for dividing the input FIFO serial data streams into small groups and feeding the groups parallely into the input data busses; means for dividing the output FIFOs into corresponding small groups connected by corresponding selectors to computational unit busses to provide group outputting in parallel; a clock-controlled micro sequencer for switching the selectors in accordance with various predetermined logic sequences in the matrix to effect the selection of data fed through the selectors to their corresponding output FIFOs and in desired combinations selected from the input FIFO data, the results of the computational units, and the data patterns, thereby manipulating the original data streams as desired.

23. Apparatus as claimed in claim 22 and in which said manipulating is effected by one or more of means for deleting and increasing data bytes from the input FIFO data streams and for inserting data patterns and computational results.

24. Apparatus as claimed in claim 23 and in which the FIFO data streams comprise datagram headers that are to be manipulated for network interfacing.

25. Apparatus as claimed in claim 23 wherein an original datagram header suitable for a first network is passed through and then manipulated and the manipulated datagram header is then applied to a second network for which said manipulated datagram header and not the original datagram header is suitable.

26. Apparatus as claimed in claim 25 wherein the rate of the clock sequencer is set of the order of tens to hundreds of megahertz for data stream rates of the orders of multiples of G bits/sec.

27. Apparatus as claimed in claim 26 wherein the clock rate is about 40–100 megahertz and the data stream rates set to about 10 G bits/Sec and higher.

28. Apparatus as claimed in claim 27 wherein the data stream rates are set to correspond to those required of from 0C48 to OC192 operation.

29. Apparatus as claimed in claim 1 wherein there are provided at least eight input and output data groups having, respectively 0–7, 8–15, 16–23, 24–31, 32–39, 40–47, 48–55, and 56–63 data bytes.

30. Apparatus as claimed in claim 29 wherein the data patterns are similarly provided in similar groups.

31. Apparatus as claimed in claim 30 wherein at least eight parallel busses are provided in the matrix, for each of the input data, the data pattern, and the computation unit highways.

32. Apparatus as claimed in claim 30 wherein the matrix switching is of M*N type, where N is the number of input bytes and M, the number of multiplexes effected by the selectors.

* * * * *